Dec. 27, 1955    L. J. VANDERBERG ET AL    2,728,226
DEEP TANK LIQUID LEVEL INDICATING APPARATUS
Filed Dec. 26, 1952    2 Sheets-Sheet 2
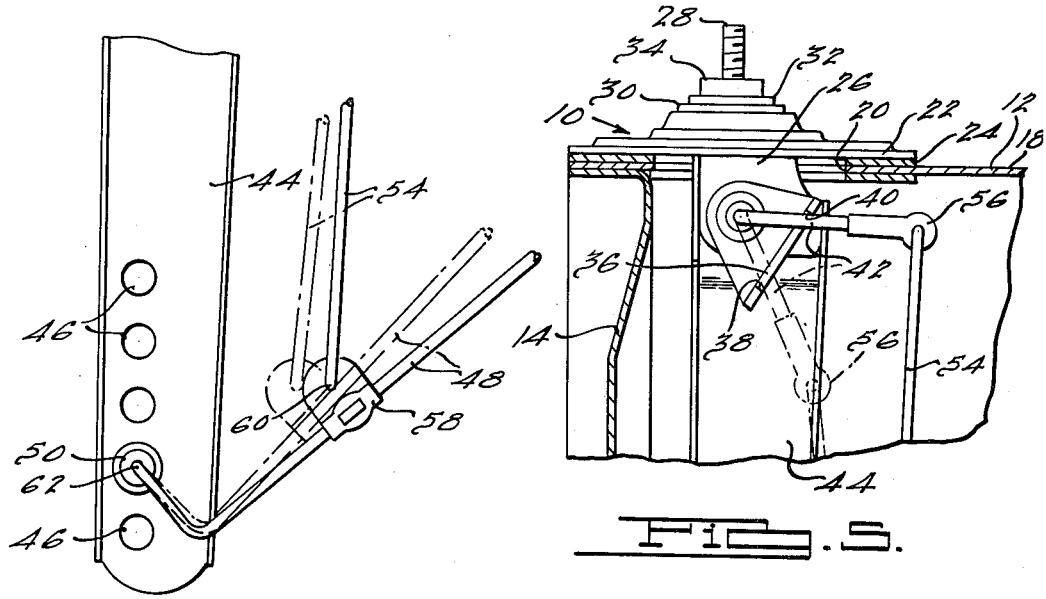
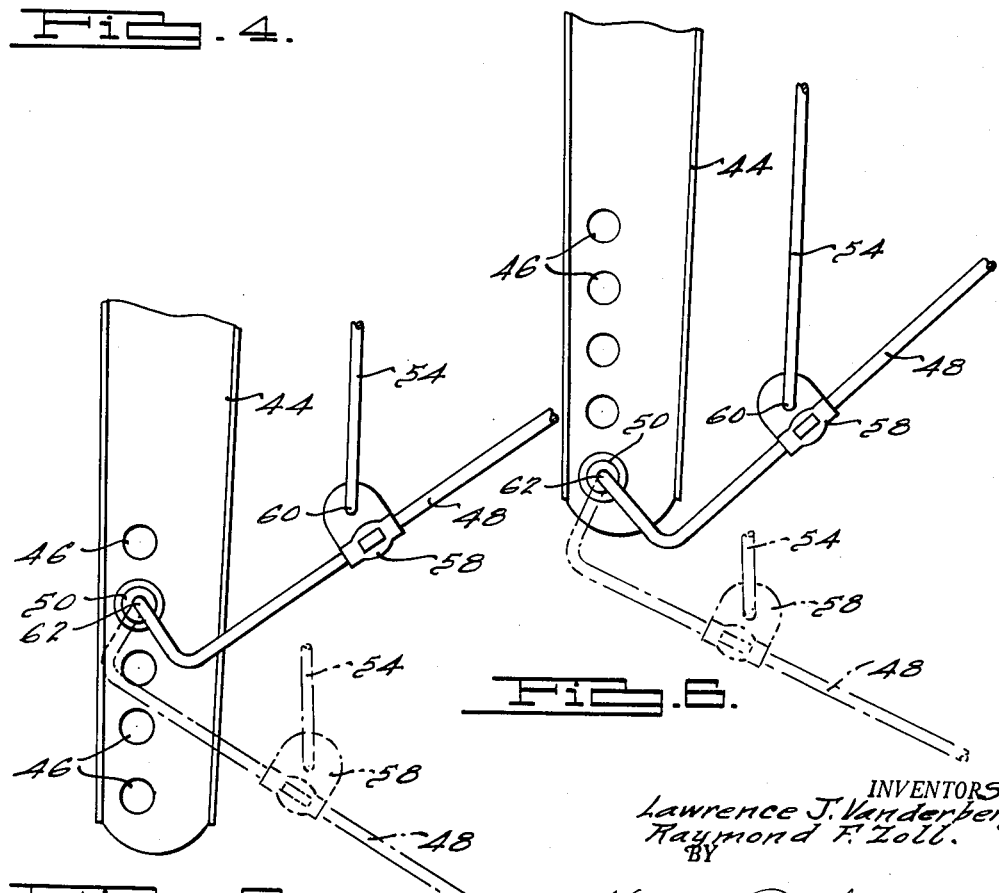
INVENTORS.
Lawrence J. Vanderberg,
Raymond F. Zoll.
BY
Harness, Dickey & Pierce.
ATTORNEYS.

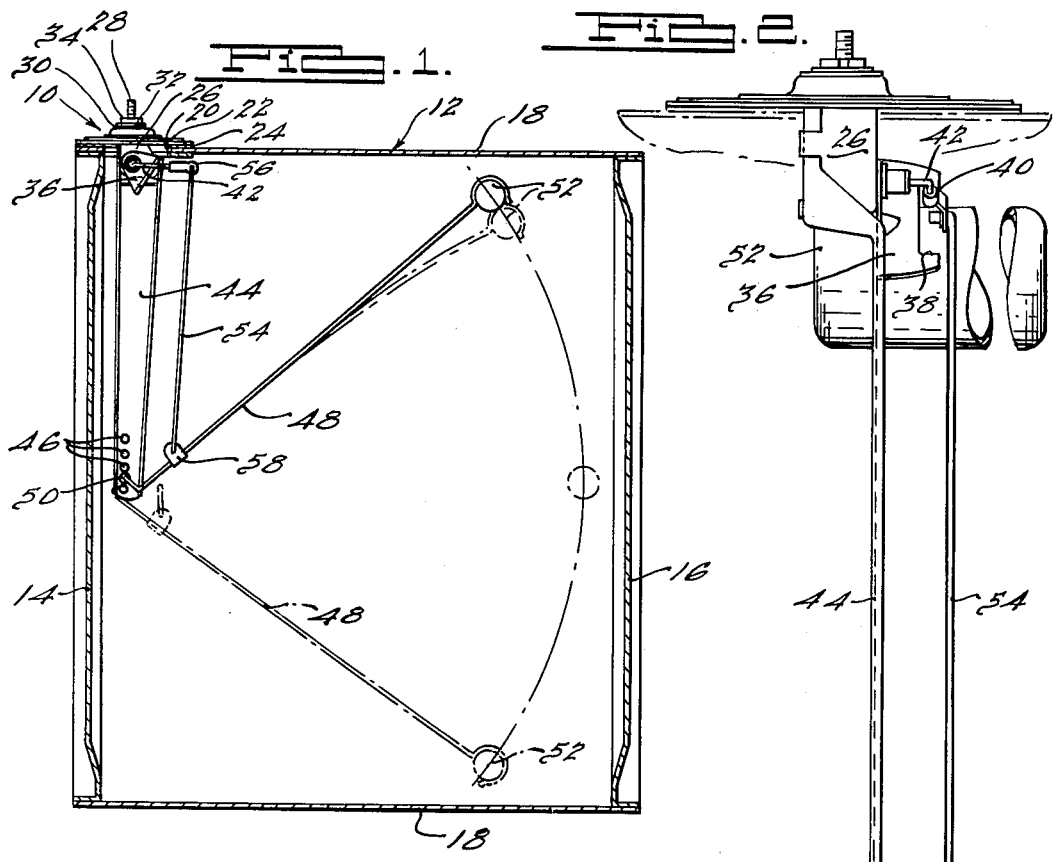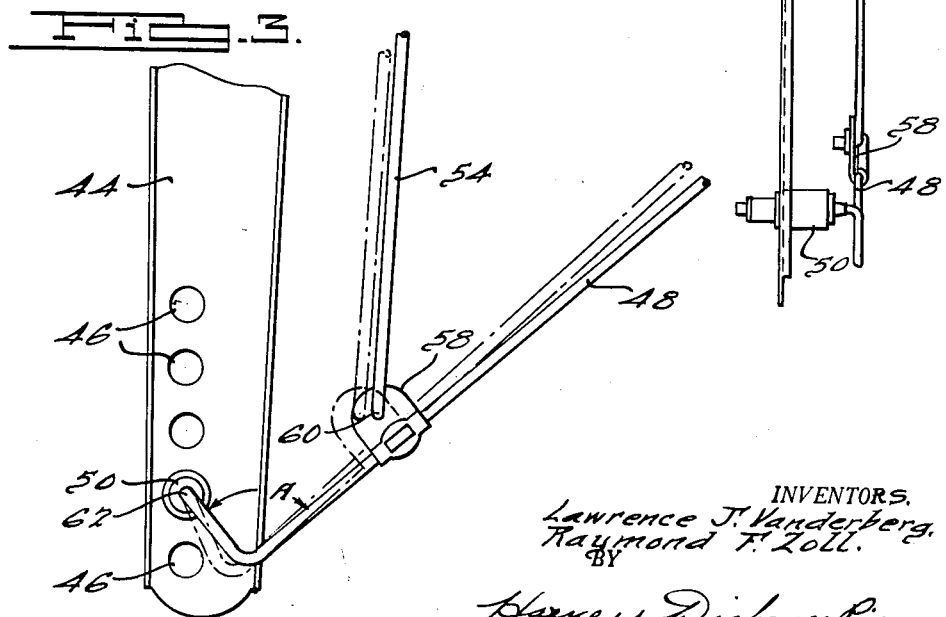

United States Patent Office 2,728,226
Patented Dec. 27, 1955

2,728,226

DEEP TANK LIQUID LEVEL INDICATING APPARATUS

Lawrence J. Vanderberg and Raymond F. Zoll, Ann Arbor, Mich., assignors to King-Seeley Corporation, Ann Arbor, Mich., a corporation of Michigan Application December 26, 1952, Serial No. 328,044

1 Claim. (Cl. 73—317)

The present invention relates to a liquid level indicating apparatus and more particularly to an improved deep tank unit for such apparatus.

It is conventional in apparatus of this type to include a liquid level indicator adapted to provide readings from "empty" to "full" in response to the movement of a pivotally mounted actuator arm between fixed limits. The movement of the actuator arm is controlled by a float to which it is connected. The present invention relates to the means connecting the actuator arm to the float and is independent of the particular means chosen for insuring that the readings of the indicator properly correspond to the position of the actuator arm.

It is an object of the present invention to provide an improved apparatus of the above mentioned type including improved means for connecting the float to the sender unit.

It is a further object to provide such an apparatus which is particularly adapted for operation in deep tanks.

Another object of the invention is to provide an improved apparatus of the above mentioned type which may be readily adjusted for use in tanks of different types and depths.

It is also an object of the present invention to provide an improved tank unit which may be completely and finally assembled, after which it may be adjusted for use in tanks of different depths without replacement or loosening of any of the assembled parts thereof.

It is also an object of the invention to provide an improved tank unit of the above mentioned type which is simple in design, economical of manufacture and reliable and efficient in operation.

It will be apparent to those skilled in the art that the tank unit of the present invention may be readily adapted for use in liquid level indicating apparatus of various types and for use in tanks of a wide variety of types and sizes. For purposes of illustration but not limitation, the tank unit of the present invention is herein illustrated and described in connection with an electric liquid level indicating apparatus and the tank disclosed is of the type used as the fuel tank in some types of trucks.

Other and more detailed objects of the present invention will be appreciated by those skilled in the art from a consideration of the following specification, the appended claim, and the accompanying drawings wherein:

Figure 1 is an elevational view of a tank unit embodying the present invention mounted in a tank shown in section and showing the full position in full lines;

Figure 2 is a elevational view of the tank unit illustrated in Figure 1 taken from the left-hand side thereof as viewed in Figure 1;

Figure 3 is an enlarged fragmentary elevational view of the lower portion of the tank unit illustrated in Figure 1, the broken line representation showing the position of the parts after an adjustment during the calibration of the unit;

Figure 4 is an elevational view similar to Figure 3, showing in broken lines the position of the parts after another adjustment made in the calibration of the unit;

Figure 5 is an enlarged fragmentary elevational view of the upper portion of the tank unit illustrated in Figure 1; and Figures 6 and 7 are elevational views similar to Figure 3, Figure 6 showing the position of assembly of the parts for a substantially deeper tank than that illustrated in Figure 1 and Figure 7 illustrating the position of assembly of the parts for a substantially shallower tank than that illustrated in Figure 1.

Referring to the drawings, the tank unit there illustrated and generally indicated at 10 is shown in Figure 1 mounted in a tank 12 of a type used for the fuel tank of cab-over-engine trucks. It will be noted that it has a substantially greater depth than the type of tank conventionally used for passenger car fuel tanks. The tank 12 includes end walls 14 and 16 and a continuous wall 18, the end walls 14 and 16 and the continuous wall 18 being, in the construction illustrated, of a shape to provide a generally rectangular tank 12. The upper portion of the wall 18 is provided with an aperture 20 adjacent the end wall 14 and the tank unit 10 extends through this aperture 20 and includes a mounting plate 22 overlying the outer marginal surface of the tank wall 18 adjacent the aperture 20. The plate 22 is riveted or otherwise suitably secured to the tank wall and a suitable seal 24 is provided to prevent the escape of fluid between the plate 22 and the tank wall 18. In electric liquid level indicator apparatus a sender unit at the tank is connected to a receiver unit which controls the reading of an indicator. Since the construction of the sender unit forms no part of the present invention it is only indicated at 26 and is not shown or described in detail. The sender unit 26 is supported within the tank 12 at the inner side of the plate 22 by a terminal post 28 extending outwardly through and insulated from the plate 22 and receiving an insulator washer 30, a metal washer 32 and a nut 34. The sender 26 includes a stop bracket 36 providing a pair of spaced stops 38 and 40 which provide limits for the angular movement of an actuator arm 42 pivotally mounted on the sender 26.

The sender 26 may be of any suitable construction, such that when the actuator 42 abuts the stop 38, the signal to the receiver is such that the indicator will read "empty" and when the actuator 42 abuts the stop 40, the signal to the receiver is such that the indicator will read "full." The tank unit 10 also includes an elongated supporting bracket 44 which, in the preferred embodiment illustrated, is connected at its upper end to the sender 26 and its upper end portion serves as one wall of the casing for the sender 26. The bracket 44 is channel shaped in transverse section and is provided with a plurality of vertically spaced apertures 46 adjacent its lower end.

A float arm 48, formed of a small rod or wire, has one end pivotally mounted in a pivot post 50 which extends through one of the apertures 46 and is rigidly secured to the supporting bracket 44. The float arm 48, at its outer end, carries the float 52 which is adapted to float on the surface of the liquid received in the tank 12. The actuator arm 42 is connected to the float arm 48 by a generally vertically extending link 54, the upper end of which is pivotally connected to the actuator arm 42 by means of a connector element 56, and the lower end of the link 54 is pivotally connected to the float arm 48 by means of a clip 58. It will be noted that the float arm 48 is turned through an angle of approximately 90°, indicated at A, adjacent the end portion pivotally received in the pivot block 50.

In the manufacture of tank units for liquid level indicating apparatus of the above described type, it is important that the tank unit be accurately adjusted for the type tank in which it is to be installed so that in use the float 52 will be accurately located in the proper "full" position when the actuator arm 42 abuts the stop 40, and will be located in the proper empty position when the actuator arm 42 abuts the stop 38. To insure this proper adjustment of the unit, it will be appreciated that both the extent of movement of the float 52, corresponding to movement of the actuator 42 between the stops 38 and 40, and the location of the arc of movement of the float 52, must be correct. In manufacturing these tank units the unit is adapted for use in tanks within one of several ranges of depths, the particular range being determined by the one of the apertures 46 in which the pivot post 50 is mounted.

For example, if the unit is to be used in a tank substantially shallower than the tank 12 illustrated in Figure 1, the pivot post 50 may be secured in one of the upper apertures 46 in the bracket 44, as is illustrated in Figure 7 and if the tank in which the unit is to be used is substantially deeper than the tank 12, the pivot post 50 may be mounted in the lowest aperture 46 of the bracket 44, as illustrated in Figure 6. The length of the link 54 should correspond to the particular aperture 46 in which the pivot post is mounted so that in a construction such as that illustrated in Figure 7, the link 54 is shorter than the corresponding link 54 illustrated in Figures 1, 2, and 3 and in the tank unit illustrated in Figure 6, the link 54 is longer than the corresponding link of the unit illustrated in Figures 1, 2 and 3. Also, in order that the vertical movement of the float 52 below its position when the arm 48 is horizontal, shall not appreciably exceed its vertical movement above such position, and to provide approximately the desired extent of movement of the float 52, it is desirable to decrease the distance between the pivotal connection indicated at 60 between the lower end of the link 54 and the clip 58, and the pivot post 50 when the pivot post 50 is disposed as illustrated in Figure 6, and to increase this distance when the pivot post 50 is disposed as illustrated in Figure 7. This has been done in the constructions illustrated in Figures 6 and 7, by securing the clip 58 to the arm 48 in different positions than in the construction of Figure 3.

The extent of movement of the float 52, pursuant to movement of the actuator arm 42 between the stops 38 and 40, is made to generally approximate that desired in the particular type tank in which the unit is to be used by sliding the clip 58 along the float rod 48 to the proper position prior to the fastening of the clip 58 to the rod 48 which may be done by crimping or in any other suitable way. The above mentioned portion of the arm 42 forming the angle A is disposed between the clip 58 and the pivot post 50 and the final adjustment of the extent of movement of the float 52 corresponding to movement of the actuator arm 42 between the stops 38 and 40 is made by bending this portion of the rod 48 to increase or decrease the angle A. It will be appreciated that by thus changing the angle A, the axis 60 of the pivotal movement between the rod 54 and the clip 58 may be moved toward or away from the axis 62 about which the float arm 48 pivots relative to the supporting bracket 44. It is an important feature of this invention that this final adjustment of the extent of movement of the float 52 may be readily made after the complete and final assembly of the tank unit 10.

The location of the arc of movement of the float 52 is initially determined in the manufacture of the tank unit by the mounting of the pivot post 50 in the desired one of the apertures 46 and the final accurate location of the arc of movement of the float 52 is made by bending the portion of the float arm 48 intermediate the clip 58 and the float 52, as illustrated in the upper broken line showing, in Figure 1. It will be appreciated that such bending of the float arm 48 intermediate the clip 58 and the float 52 does not alter the extent of movement of the float 52 corresponding to movement of the actuator 42 between the limits 38 and 40 but rather is effective to accurately locate the arc of movement.

By the above described adjustments it will be appreciated that the tank unit 10 may be accurately adjusted for the particular type tank in which it is to be used, so that when the actuator arm 42 abuts the stop 40, the float 52 will be disposed in the desired full position within the tank 12, and will be disposed in the proper empty position when the actuator arm 42 abuts the stop 38. When the proper location of the clip 58, the proper size for the angle A, and the amount of any bend in the arm 48 have once been determined for a particular type tank, these adjustments may be quickly made by assembly workers provided with suitable fixtures or tools.

While only one specific embodiment of the present invention has been illustrated and described in detail, it will be readily appreciated by those skilled in the art that numerous modifications and changes may be made without departing from the spirit of the invention.

What is claimed is:

A tank unit for a deep tank liquid level indicating apparatus adapted to be easily adjusted for use with any of a wide variety of tanks and including a liquid level indicator adapted to provide readings between empty and full and controlled by said tank unit, said tank unit comprising a pivotally mounted actuator and a pair of spaced stops disposed to prevent movement of said actuator beyond predetermined limits corresponding to empty and full readings of said indicator, means for mounting said unit on a wall of said tank, a supporting member adapted to be disposed within said tank when said unit is mounted on said tank, an arm having one end pivotally connected to said supporting member, a float mounted on the other end of said arm, a link having one end pivotally connected to said actuator and the other end pivotally connected to said arm, said arm intermediate said one end and the pivotal connection of said link to said arm, having angularly extending portions and an interconnecting portion deformable to increase or decrease the angle between said angularly extending portions and thereby change the distance between the pivotal connection of said arm to said supporting member and the pivotal connection of said arm to said link, said angle between said angularly extending portions being approximately 90°.

References Cited in the file of this patent

UNITED STATES PATENTS

| | | |
|---|---|---|
| 1,141,500 | Stahle | June 1, 1915 |
| 1,201,527 | Tanner | Oct. 17, 1916 |
| 1,406,312 | Wessoleck | Feb. 14, 1922 |
| 1,634,165 | Williams | June 28, 1927 |
| 2,266,298 | Bacon | Dec. 16, 1941 |
| 2,446,844 | Molaver | Aug. 10, 1948 |
| 2,468,284 | Balken | Apr. 26, 1949 |